United States Patent [19]
Kawakatsu et al.

[11] Patent Number: 5,113,109
[45] Date of Patent: May 12, 1992

[54] OPTICAL INTERFERENCE FILM AND LAMP HAVING THE SAME

[75] Inventors: Akira Kawakatsu; Akiko Saito; Yoji Yuge, all of Kanagawa, Japan

[73] Assignee: Toshiba Lighting & Technology Corporation, Tokyo, Japan

[21] Appl. No.: 613,054

[22] Filed: Nov. 15, 1990

[30] Foreign Application Priority Data

Nov. 24, 1989 [JP] Japan .................. 1-305545

[51] Int. Cl.⁵ .............................................. H01K 1/32
[52] U.S. Cl. ..................... 313/112; 313/113
[58] Field of Search ............ 313/112, 113, 580; 350/1.6, 311

[56] References Cited

U.S. PATENT DOCUMENTS

| | | | |
|---|---|---|---|
| 4,229,066 | 10/1980 | Rancourt et al. | 350/1.6 |
| 4,634,919 | 1/1987 | Yuge et al. | 313/112 |
| 4,983,001 | 1/1991 | Hagiuda et al. | 350/1.6 |

FOREIGN PATENT DOCUMENTS

| | | |
|---|---|---|
| 0305135 | 3/1989 | European Pat. Off. |
| 0369254 | 5/1990 | European Pat. Off. |
| 2183363 | 6/1987 | United Kingdom |

*Primary Examiner*—Donald J. Yusko
*Assistant Examiner*—Nimeshkumar D. Patel
*Attorney, Agent, or Firm*—Oblon, Spivak, McClelland, Maier & Neustadt

[57] ABSTRACT

An optical interference film formed on the surface of the bulb of a lamp includes high refractive index layers and low refractive index layers alternately stacked on each other to form more than ten layers in all. Each high refractive index layer includes titanium oxide containing at least one additive selected from the group consisting of antimony (Sb), silicon (Si) and tantalum (Ta). An amount of the at least one additive is the range from 0.1% to 30% of the titanium oxide in terms of the metal atomic ratio.

7 Claims, 1 Drawing Sheet

OPTICAL INTERFERENCE FILM AND LAMP HAVING THE SAME

BACKGROUND OF THE INVENTION

1. Field of the invention

The present invention relates, in general, to optical interference films. In particular, the invention relates to an interference film, formed on the outer or inner surface of a lamp, e.g., a halogen lamp, which selectively reflects light from the optical spectrum in a prescribed wavelength range.

2. Description of the related art

A halogen lamp which radiates light having a small amount of infrared rays is well known. In such a halogen lamp, a filament is disposed at the center of a glass bulb, and an optical interference film is formed on the outer surface of the bulb. The optical interference film transmits visible rays and reflects infrared rays Thus, infrared rays in the light radiated from the filament are reflected toward the filament by the optical interference film and heat the filament. As a result, a decrease in infrared rays in the radiated light and an improvement of the luminous efficiency are achieved by the interference film on the conventional halogen lamp.

The Japanese laid-open patent publication 62-105357 discloses one example of such an optical interference film, which includes high refractive index layers and low refractive index layers alternately stacked one on the other, these being a total of nine to twelve layers, or more. Each high refractive index layer includes at least one metal oxide selected from titanium oxide ($TiO_2$), tantalum oxide ($Ta_2O_5$) and zirconium oxide ($ZrO_2$) as a main component, and at least one additive selected from phosphorus (P), boron (B), arsenic (As), antimony (Sb), tin (Sn), zinc (Zn), lead (Pb), potassium (K), nickel (Ni) and cobalt (Co). Each low refractive index layer includes silica ($SiO_2$) as a main component, and at least one additive selected from phosphorus (P) and boron (B).

In the above-described conventional optical interference film, each inter-layer connection between high and low refractive index layers is strengthened by the additives. Distortion in the optical interference film caused by the difference in the heat expansion coefficient between the high and low refractive index layers is also reduced by the additives. Thus, cracking or peeling of the optical interference film can be avoided.

However, the above-described additives adversely affect the heat-resisting ability of the optical interference film, so that luminous flux from such a lamp decreases significantly with time when the lamp is in use.

SUMMARY OF THE INVENTION

Accordingly, it is an object of the present invention to provide an optical interference film of desirably high transmitting without decreasing unacceptably the heat-resisting property of the optical interference film.

To accomplish the above-described objects, an optical interference film includes at least two refractive layers of different refractive indices on the transparent substrate and at least one additive selected from the group consisting of antimony (Sb), silicon (Si) and tantalum (Ta) in the refractive layer having a higher refractive index.

The refractive layer having the higher refractive index may include at least one compound, as a glass forming agent, selected from a phosphorus compound and a boron compound.

The refractive layer having the higher refractive index may also include titanium oxide. An amount of the at least one additive to titanium oxide is 0.1% to 30% in terms of the metal atomic ratio.

The optical interference film may be formed on at least either inner or outer surface of a halogen lamp to reflect infrared rays and transmits visible rays from the optical spectrum.

BRIEF DESCRIPTION OF THE ACCOMPANYING DRAWINGS

These and other objects and advantages of this invention will become more apparent and more readily appreciated from the following detailed description of the presently preferred embodiment of the invention, read in conjunction with the accompanying drawings wherein:

FIG. 1 is a side view partly in section illustrating a halogen lamp with an optical interference film of one embodiment of the present invention; and FIG. 2 is a sectional view illustrating the optical interference film formed on the halogen lamp shown in FIG. 1.

DETAILED DESCRIPTION OF THE PREFERRED EMBODIMENT

The preferred embodiment of the present invention will now be described in more detail with reference to the accompanying drawings. In this embodiment, the present invention is applied to a well known type of halogen lamp.

Figure 1:
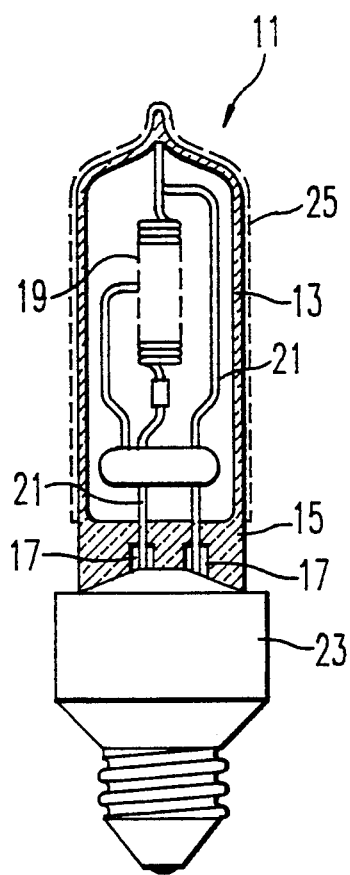
Figure 2:
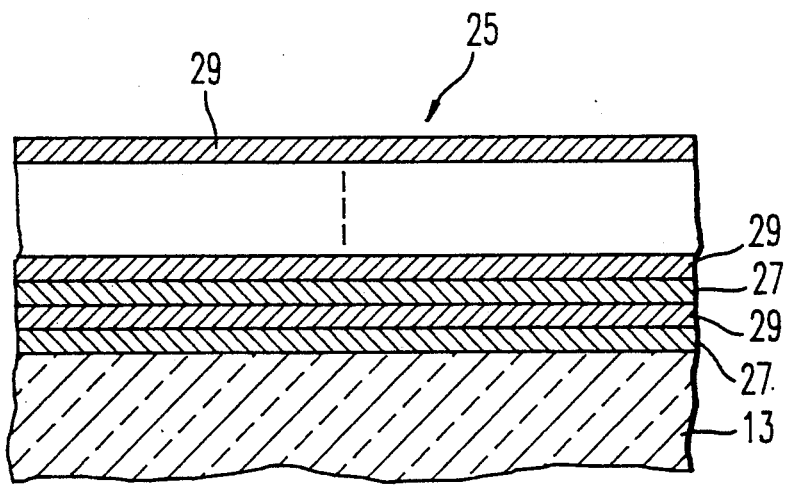

As shown in FIG. 1, a halogen lamp 11 includes a transparent bulb 13 made of a quartz glass or an aluminosilicate glass. One end of bulb 13 is closed, and the other end is pinched to form a sealed portion 15. A pair of molybdenum foils 17 and 17 is arranged in sealed portion 15. A coiled filament 19 acting as a light emitting member is arranged along the central axis of bulb 13. Each end of coiled filament 19 is electrically connected to a corresponding one of the foils 17 and 17 through a corresponding one of two inner lead wires 21 and 21. Sealed portion 15 of bulb 13 is fixed into a metalliccap 23. A fill including an inert gas such as argon and an amount of halogen is sealed in bulb 13. An optical interference film 25 is formed on at least either the inner or outer surfaces, e.g., outer surface, of bulb 13. Optical interference film 25 transmits visible rays and reflects infrared rays from the optical spectrum. As shown in FIG. 2, optical interference film 25 includes high refractive index layers 27, the principal component of which is titanium oxide ($TiO_2$) and low refractive index layers 29 the principal component of which is silica ($SiO_2$). A first one of the high refractive index layers 27 is formed on the outer surface of bulb 13 and a low refractive index layer 29 is then formed on that first high refractive index layer 27. Further high and low refractive index layers 27 and 29 are then formed alternately to provide a stacked arrangement of a desired total number of layers.

A method of forming the optical interference film will now be described. Firstly, titanium-alkoxide and alkoxide of at least one metal additive selected from the group consisting of antimony (sb) silicon (Si) and tantalum (Ta) are prepared in a vessel. Ethanol is added to and is uniformly mixed in the vessel. Either an acylating agent or a chelating agent is also provided in the vessel as the liquid therein is stirred at room temperature, and a reaction is caused to take place by heating the liquid, whilst maintaining it under reflux conditions, for about one hour. A glass forming agent is then added to the liquid resulting from that reaction and thus a first coating liquid whose density converted to a composite oxide is 4.5 percent by weight (wt%) is finally obtained. The above-described glass forming agent may include an inorganic or organic phosphorus compound or boron compound which has an organic solvent solubility. The above-described glass forming agent such as a phosphorus compound or a boron compound is added at less than ten percent by weight (wt%), preferably 0.1 to 5.0 percent by weight (wt%), to a total amount converted to a composite metal oxide on an oxide basis.

In a first coating process, bulb 13 is dipped into the first coating liquid obtained by the above-described steps and is pulled up at a constant speed. A titanium oxide film (hereinafter referred to as $TiO_2$ film), i.e. a first high refractive index layer 27, is then fixed on the outer surface of bulb 13 by baking bulb 13 for ten minutes at from four hundred to nine hundred degrees centigrade (° C) in air.

Secondly, a second coating liquid, including an organosilicon compound, e.g. alkoxysilane such as tetramethoxysilane, tetraethoxysilane, tetraisopropoxysilane, tetrabutoxysilane, diethoxydiisopropoxysilane and diohlorodimethoxysilane and/or a polymer thereof, is prepared.

In a second coating process, bulb 13 on which the first high refractive index layer 27 has been formed is dipped into the second coating liquid and is pulled up at a constant speed. A silica film, i.e. a low refractive index layer 29, is then fixed on the first high refractive index layer 27 by baking bulb 13 for ten minutes at from four hundred to nine hundred degrees centigrade (° C) in air. The required complete optical interference film 25 is formed on bulb 13 by repeatedly executing the above-described first and second coating processes, preferably at least five times (giving at least 10 layers in all).

The principles of the above-described embodiment will now be described in more detail. In general, the crystal structure of the $TiO_2$ film formed by the above-described processes is amorphous, anatase or rutile. An amorphous-$TiO_2$ film and an anatase-$TiO_2$ film have high visible transmittance and have low refractive index, as compared with a rutile-$TiO_2$ film. In addition, the crystal structure of the amorphous-$TiO_2$ film or the anatase-$TiO_2$ film is changed to that of the rutile-$TiO_2$ film (a high temperature stable type) when it is heated at a high temperature for a relatively long period. The rutile-$TiO_2$ film has a high thermal stability and a high refractive index, as compared with the anatase-$TiO_2$ film. However, the transmittance of the $TiO_2$ film for a range of visible rays is decreased when the crystal structure of the amorphous-$TiO_2$ film or the anatase-$TiO_2$ film is changed to that of the rutile-$TiO_2$ film. By appropriate control of the phase-change from the amorphous-$TiO_2$ or the anatase-$TiO_2$ to the rutile-$TiO_2$ it is possible to produce a high refractive index layer, for an optical interference film, which layer has an advantageous combination of high refractive index and high visible transmittance.

In the above-described embodiment, in which the high refractive index layer 27 shown in FIG. 2 includes titanium oxide as a main component, the addition of at least one metal additive selected from the group consisting of antimony (Sb), silicon (Si) and tantalum (Ta), provides a means whereby the phase-change from the amorphous-$TiO_2$ or the anatase-$TiO_2$ to the rutile-$TiO_2$, in the high refractive index layer 27, under influence of a high temperature can be controlled. Growth of crystal particles in high refractive index layer 27 can also be controlled. Thus, decrease in the visible transmittance of high refractive index layer 27 can be controlled while achieving high heat-resistant ability for that layers. To a certain extent, the greater the included proportion of the above-described metal additive, the greater the above-described desirable effects. However, too much of the above-described metal additive can cause the refractive index of the composite oxide thin film layer 27 to be decreased unacceptably. A preferred range of the quantity of the above-described metal additive (M) compared with the quantity of titanium (Ti) in the high refractive index layer 27, in terms of the metal atomic ratio, is as follows:

$$0.1(\%) < M/Ti < 30(\%).$$

To carry out experiments, a number of sample lamps were prepared, each provided with more than ten layers stacked one upon another and made alternately of high refractive index titanium oxide ($TiO_2$) and low refractive index silica ($SiO_2$) In a first sample of the above-described lamps, the high refractive index layers have no additive, and in second samples, the high refractive index layers are conventional high refractive index layers having a phosphorous additive (P) in the proportions 0.5 (%) and 1 (%) respectively. Third samples of the lamps have conventional high refractive index layers having a boron additive (B) amounting to 1 (%) and 0.5 (%) respectively. Fourth samples of the lamps include high refractive index layers having antimony (Sb) as an additive varing from 0.05% to 40% in amount.

Results of the experiments are shown in TABLES I and II. In TABLES I and II, the luminous flux ratio of each sample is expressed by a relative value (%), with the initial luminous flux of the sample which includes no additive being taken as one hundred percent (%).

TABLE I

| BAKING TEMP. | AMOUNT OF METAL ADDITIVE (ATOM RATIO) | $TiO_2$ (n) | FILM (T) | LUMINOUS FLUX RATIO | LUMINOUS FLUX RATIO AFTER 2000 hrs LIGHTING |
| --- | --- | --- | --- | --- | --- |
| 600 (°C.) | none | 2.10 | 92.3% | 100% | 44% |
| 10 (min) | Sb 40% | 2.09 | 92.3% | 99% | 67% |
| | Sb 25% | 2.13 | 92.5% | 108% | 94% |
| | Sb 5% | 2.20 | 93.0% | 117% | 95% |
| | Sb 1% | 2.18 | 93.2% | 118% | 96% |
| | Sb 0.1% | 2.17 | 93.2% | 116% | 95% |
| | Sb 0.05% | 2.14 | 93.0% | 111% | 68% |
| | P 1% | 2.09 | 92.1% | 99% | 53% |
| | P 0.5% | 2.10 | 92.0% | 100% | 48% |
| | B 1% | 2.07 | 91.0% | 96% | 33% |

TABLE I-continued

| BAKING TEMP. | AMOUNT OF METAL ADDITIVE (ATOM RATIO) | TiO$_2$ (n) | FILM (T) | LUMINOUS FLUX RATIO | LUMINOUS FLUX RATIO AFTER 2000 hrs LIGHTING |
|---|---|---|---|---|---|
| | B 0.5% | 2.08 | 91.5% | 98% | 39% | n: initial refractive index
T: transmittance

TABLE II

| BAKING TEMP. | AMOUNT OF METAL ADDITIVE (ATOM RATIO) | TiO$_2$ (n) | FILM (T) | LUMINOUS FLUX RATIO | LUMINOUS FLUX RATIO AFTER 2000 hrs LIGHTING |
|---|---|---|---|---|---|
| 900 (°C.) 10 (min) | none | 2.17 | 92.4% | 100% | 56% |
| | Sb 40% | 2.25 | 92.6% | 106% | 82% |
| | Sb 25% | 2.26 | 91.4% | 118% | 94% |
| | Sb 5% | 2.35 | 91.8% | 117% | 96% |
| | Sb 1% | 2.30 | 91.6% | 116% | 97% |
| | Sb 0.1% | 2.29 | 93.6% | 116% | 96% |
| | Sb 0.05% | 2.19 | 92.8% | 104% | 62% |
| | P 1% | 2.15 | 93.0% | 98% | 49% |
| | P 0.5% | 2.16 | 92.8% | 99% | 46% |
| | B 1% | 2.13 | 90.8% | 92% | 30% |
| | B 0.5% | 2.15 | 91.4% | 96% | 40% | n: initial refractive index
T: transmittance

As can be seen in TABLES I and II, a conventional optical interference film employing a high refractive index layer, i.e. titanium oxide (TiO$_2$) layer, to which phosphorus (P) or boron (B) is added has a relatively low refractive index (n) and a relatively low luminous flux. In addition, the luminous flux of the above-described optical interference film is greatly decreased after 2000 hours lighting. However, optical interference films including high refractive index layers made of titanium oxide to which antimony (Sb) is added have relatively high initial refractive index, and the luminous flux thereof after 2000 hours lighting is maintained at a relatively high value, as compared with the conventional optical interference films. More desirable results are achieved when the high refractive index layer is baked at 900 degree centigrade (° C), as shown in TABLE II.

To some extent, the lower the proportion of antimony (Sb) added to the high refractive index titanium oxide layer, the higher the refractive index (n) of that layer. However, with a very low proportion of antimony (Sb) in the high refractive index layer the results achieved are poor. As stated above, a desirable proportional range of antimony (Sb) in the high refractive index layer is between 0.1% and 30%. Similar effects can be obtained when silicon (Si), or tantalum (Ta) is added to the high refractive index layer as a metal additive.

As described above, in an embodiment of the present invention, by adding at least metal additive selected from the group consisting of antimony (Sb), silicon (Si) and tantalum (Ta) to a high refractive index layer made of titanium oxide, desirable optical characteristics such as a high luminous flux and a high heat-resisting ability can be achieved.

The present invention has been described with respect to a specific embodiment. However, other embodiments based on the principles of the present invention should be obvious to those of ordinary skill in the art. Such embodiments are intended to be covered by the claims.

What is claimed is:

1. An optical interference film for reflecting light from the optical spectrum in a prescribed wavelength range, the film comprising:
   a transparent substrate;
   at least two refractive layers of different refractive indices on the substrate, one of the at least two refractive layers having a higher refractive index and including a metal oxide; and
   at least one additive selected from the group consisting of antimony (Sb), silicon (Si) and tantalum (Ta) whose quantity in relation to said metal oxide is in the range from 0.1% to 30% in terms of the metal atomic ratio in the one of the at least two refractive layers.

2. A film according to claim 1, wherein the refractive layer having the higher refractive index includes at least one compound, as a glass forming agent, selected from a phosphorus compound and a boron compound.

3. A film according to claim 1, wherein said metal oxide is titanium oxide.

4. A film according to claim 3, wherein the refractive layer having the higher refractive index includes at least one compound, as a glass forming agent, selected from a phosphorus compound and a boron compound.

5. A lamp for reflecting infrared rays and transmitting visible rays from a light source, comprising:
   a light permeable bulb;
   a filament in the bulb for generating light;
   at least two refractive layers of different refractive indices on at least one of the inner and outer surface of the bulb, one of the at least two refractive layers having a higher refractive index and including a metal oxide; and
   at least one additive selected from the group consisting of antimony (Sb), silicon (Si) and tantalum (Ta) whose quantity in relation to the metal oxide is in the range from 0.1% to 30% in terms of the metal atomic ratio in the one of the at least two refractive layers.

6. A lamp according to claim 5, wherein said metal oxide is titanium oxide.

7. A lamp according to claim 6, wherein the refractive layer having the higher refractive index includes at least one compound, as a glass forming agent, selected from a phosphorous compound and a boron compound.

* * * * *